Aug. 11, 1953　　C. C. CARTER　　2,648,322
REPLACEMENT GUIDE FOR POPPET VALVE STEMS
Filed May 7, 1952

Inventor
Charles C. Carter
By
Lancaster, Allwine Rommel
Attorneys

Patented Aug. 11, 1953

2,648,322

UNITED STATES PATENT OFFICE 2,648,322

REPLACEMENT GUIDE FOR POPPET
VALVE STEMS

Charles C. Carter, Lubbock, Tex.

Application May 7, 1952, Serial No. 286,533

3 Claims. (Cl. 123—188)

This invention relates to poppet valve assemblies, such as are provided in internal combustion engines for control of the intake and exhaust gases, and such fluids as oil which are entrained therein.

New and used engines of this type, primarily designed for use in motor vehicles, are extensively used as stationary engines to operate pumps in sections of the country requiring irrigation. They are also frequently used for other purposes and butane, propane and natural gas, instead of gasoline, have been found to have certain advantages as fuels for operating such engines. Among these advantages, are low cost of the fuel in many localities and the ability to store a supply of such fuels as propane and butane, drawing upon the supply for a long period of time, in a comparatively small space.

A comparatively inexpensive engine, suitable for stationary use, in the Ford automobile engine of the type in which the cylinder block is provided with circular poppet valve seats and companion axially aligned valve stem guide bores, of rather large diameter, each companion seat and bore for cooperation with a poppet valve system or assembly including the poppet valve, a valve stem guide, somewhat loosely disposed in the bore, spring retainer on the valve stem and expansion coil spring, normally compressed between the spring retainer and guide, all of which may be slidably removed, while in assembled condition, through the valve seat opening and bore, after a forked or bifurcated valve guide retainer or "keeper" has been detached from the guide. Examples of some of the types of such poppet valve assemblies are shown in patents to Douglas et al., 2,112,832, April 5, 1938, and Gass, 2,207,400, July 9, 1940. Repair parts for such poppet valve assemblies are readily available in most populated sections of the country. The expansion coil springs thereof are uniformly made to such specifications that in use they are each compressed to a very appropriate degree for efficiency in closing the valve when the throw side of the cam is not acting upon valve lifter, and to reduce wear to a minimum.

In practice, however, it has been found that engines equipped with such type of poppet valve assembly (although the free fit valve stem guides render installation of new parts of those which have become worn, a comparatively easy job) do not remain in satisfactory operative condition for any great length of time, when such dry gases (comparatively free of lubricant) as propane, butane, and natural gas are used as fuels. The valve seats become "out-of-round" through use, and sometimes, to some extent, the valve head becomes worn and there is leakage of gas due to imperfect seating of the valve at the appropriate time in the cycle of operation of the piston in the combustion chamber controlled by the valve. I attribute this to the lack of lubricant between the valve proper and its seat, combined with looseness of the valve guide. Where lubricant is naturally entrained in fuels such as gasoline, this "out-of-round" condition seldom occurs, even over a long period of time, and while it may be that the valve spring terminal portion engaging the valve stem guide may have a tendency to cant, so to speak, the comparatively loose guide to a position where the valve head or disc engages first with line contact at its tapered portion, with the tapered portion of the valve seat, and then, due to the expansion of the seat, causes surface-to-surface contact between such tapered portions, the lubricant entrained in the wet fuel prevents wear at this line contacting portion.

A major object of the invention is to provide a replacement valve stem guide which will obviate the wear above mentioned when fuels such as butane, propane and natural gas mixtures are employed in internal combustion engines of the class described.

Another major object is to provide an efficient force-fitted replacement valve stem guide which has the advantages just mentioned.

An important object is to provide a new replacement valve stem guide which requires no complicated machining since it comprises an integral body of three stepped cylindrical portions, provided with a valve stem accommodating bore, and a simple spacing and retaining ring.

A further important object is to provide a replacement valve stem guide which will remain in its proper position, without the employment of a conventional valve guide retainer and the associated groove or recesses for the retainer in the conventional valve guide.

Yet another important object is to provide a valve guide which is economical to manufacture and comprises but two parts.

Other objects and advantages of the invention will be apparent during the course of the following detailed description of the invention, taken in connection with the accompanying drawing, forming a part of this disclosure, and in which drawing.

Figure 1:
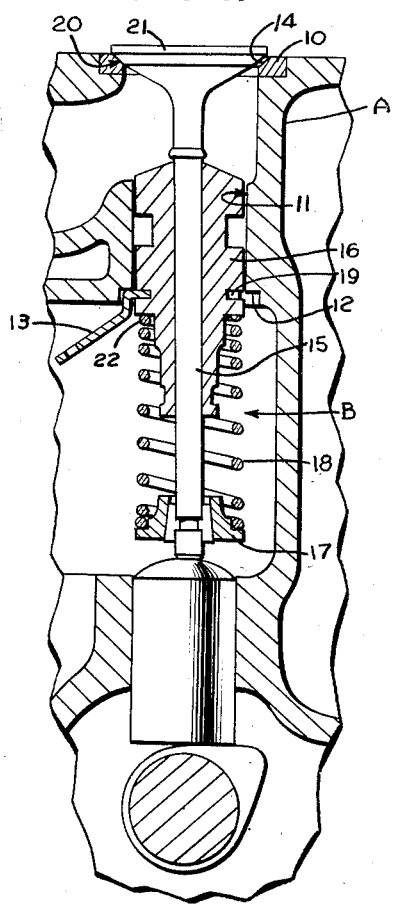
Fig. 1 is a vertical section of an internal combustion engine block containing a conventional poppet valve assembly.
Figure 2:
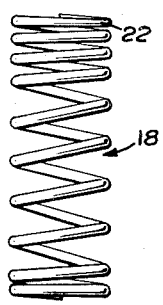
Fig. 2 is an elevation of the valve spring of Figs. 1 and 4.

In the drawing, wherein for the purpose of illustration is shown a preferred embodiment of the invention and wherein similar reference characters designate corresponding parts throughout the several views, the letter A designates an internal combustion engine cylinder block; B, a poppet valve assembly or system associated therewith; and C the new replacement guide.

The internal combustion engine cylinder block A is shown as of the type provided with a circular poppet valve seat 10 and an axially aligned valve stem guide bore 11 extending therefrom and having diameters sufficiently large enough to permit the several parts of the poppet valve assembly or system B to be slidably removed therefrom, while in assembled condition, through the valve seat 10. At the lower end of the valve stem guide bore 11 is a downwardly-facing shoulder 12 formed in the block and normally adapted to receive portions of the bifurcated end of a conventional valve guide retainer 13.

A valve assembly or system B is shown to include a valve stem 15, a loosely-fitting valve stem guide 16, a spring retainer 17 on the stem 15, and an expansion coil spring 18 normally compressed between the spring retainer 17 and guide 16. The guide 16 is peripherally grooved as at 19 to receive the other parts of the bifurcated end of the retainer 13, as is well known in the art.

Figure 3:
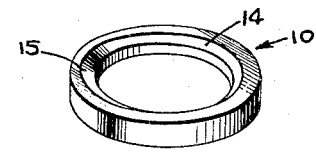
Fig. 3 is a perspective view of the tapered surface of a valve seat, which may be employed with the valve assembly of Figs. 1 and 4, but showing wear to the surface.

When using so-called non-lubricating fuels, such as butane, propane, natural gas mixtures and the like, the tapered or bevelled surface 14 of the valve seat often very quickly becomes unevenly worn or "out-of-round" as at 15 in Fig. 3, or the under tapered side 20 of the valve head or disc 21 becomes unevenly worn, as stated.

Figure 4:
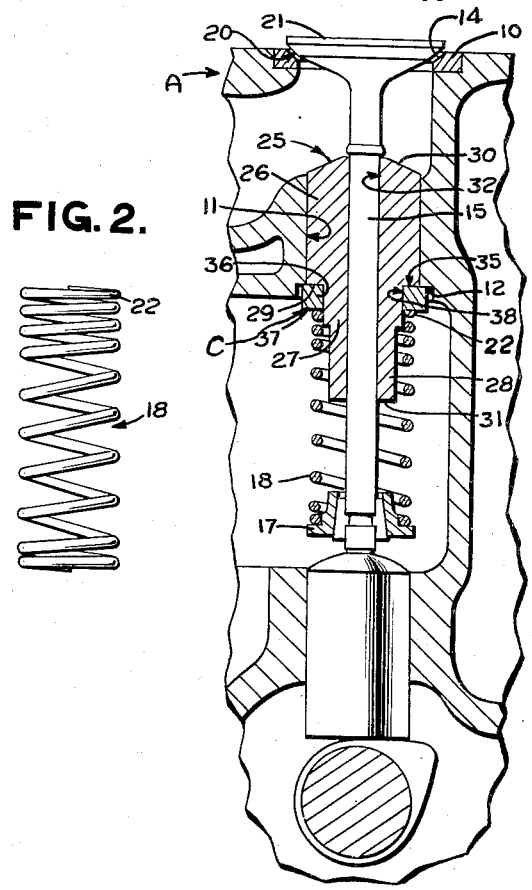
Fig. 4 is a view, somewhat like that of Fig. 1 but showing my new replacement valve stem guide substituted for the guide of Fig. 1.
Figure 5:
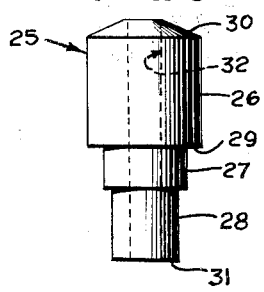
Fig. 5 is an elevation of the new guide body of Fig. 4.
Figure 6:
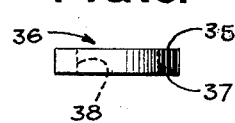
Fig. 6 is an elevation of a spacing and retaining ring of the new replacement guide.

The new replacement guide C, shown in Fig. 4, includes a cylindrical body 25 comprising three stepped portions 26, 27 and 28, and the first or uppermost cylindrical body portion 26 is adapted to extend through the bore 11 substantially as in Fig. 3 in a force fit with the walls thereof. The second or intermediate portion 27 provides a depending sleeve portion and is of lesser diameter than the portion 26 so that a downwardly-facing shoulder 29 is provided, and the third or lowermost end portion 28 is of less diameter than the portion 27. When properly positioned, as in Fig. 4, the shoulders 12 and 29 are in substantially the same horizontal plane. The external diameter of the sleeve portion 27 is such that there is a close fit of the upper end portion 22 of the spring 18, which upper end portion encircles a part of this portion 27. Extending through the body 25 from its upper face 30 to its lower face 31 is a bore 32 to slidably receive the valve stem 15.

Encircling the upper part of the sleeve portion 27 and with one flat face 35 abutting the shoulders 12 and 29 is a spacing and retaining element or ring 36. Preferably, the element 36 has a sliding fit at its inner periphery 38 with the portion 27 but its outer periphery preferably does not extend to the adjacent wall of the bore 11 although, of course, the diameter of this periphery is greater than that of the body portion 26. The other or lower flat face 37 of the element 36 is adapted to contact the terminal coil of the end portion 22 of the spring 18 so that the element 36 is forced up against the shoulders 12 and 29, and the thickness of the element 36 is such that the element 36 will retain the valve spring 18 in normal compressed and centered condition between the element 36 and the spring retainer 17.

Upon removal of the poppet valve assembly B of Fig. 1 in the well-known way, the guide 16 is discarded and the worn valve seat 10 is replaced by a new one. The bore 11 may be reamed, if necessary, and the new guide body 25 be either driven or pressed into this bore; the spacing and retaining element 36 inserted to abut the shoulders 12 and 29 and the rest of the valve assembly inserted in any desired sequence to complete the installation.

Various changes may be made to the form of the invention shown and described without departing from the spirit of the invention or scope of the claims.

What is claimed is:

1. For use in an internal combustion engine cylinder block of the type provided with a circular poppet valve seat and axially aligned valve stem guide bore having diameters sufficiently large to permit those parts of the poppet valve system comprising the valve stem, a loosely fitting valve stem guide, spring retainer on the stem and expansion coil spring normally compressed between the spring retainer and guide, to be slidably removed, while in assembled condition, through said valve seat and valve stem guide bore; the improvement which comprises a replacement guide through which the valve stem extends, comprising a cylindrical body portion having a force fit in said bore, with its lower end substantially flush with the bottom end of said bore, and a depending sleeve portion of reduced diameter extending from the lower end of said body portion and surrounding the valve stem, whereby a downwardly facing shoulder is presented at the bottom of the body portion and surrounding said sleeve, and a combination spacing and retaining ring against which the valve spring abuts, said ring in slidable engagement with and surrounding said sleeve portion and engaging said shoulder, said ring of an external diameter greater than the diameter of said body portion and engaging the surface of the block beneath said bore, and said ring of a thickness to retain the valve spring in normal compressed condition between the ring and spring retainer.

2. The improvement as set forth in claim 1 in which said sleeve portion next below said ring is of an external diameter substantially equal to the internal diameter of the coil spring, for engagement and centering cooperation therewith.

3. For use in an internal combustion engine cylinder block of the type provided with a circular poppet valve seat and axially aligned valve stem guide bore having diameters sufficiently large to permit those parts of the poppet valve system comprising the valve stem, a loosely fitting valve stem guide, spring retainer on the stem and expansion coil spring normally compressed between the spring retainer and guide, to be slidably removed, while in assembled condition, through said valve seat and valve stem guide bore; the improvement which comprises a replacement guide through which the valve stem extends, comprising a cylindrical body portion having a force fit in said bore, with its lower end substantially flush with the bottom end of said bore, and a depending sleeve portion of reduced diameter extending from the lower end of said body portion and surrounding the valve stem, whereby a downwardly facing shoulder is presented at the bottom of the body portion and surrounding said sleeve, and a combination spacing and retaining element against which the upper end portion of the valve spring abuts, said spacing and retaining element engaging said shoulder and the surface of the block beneath said bore, and said spacing and retaining element of a thickness to retain the valve spring in normal compressed condition between it and the spring retainer.

CHARLES C. CARTER.

No references cited.